United States Patent [19]
Chapman et al.

[11] Patent Number: 6,058,484
[45] Date of Patent: May 2, 2000

[54] SYSTEMS, METHODS AND COMPUTER PROGRAM PRODUCTS FOR SELECTION OF DATE LIMITED INFORMATION

[75] Inventors: Richard Alan Chapman, Cary; Mark E. Peters, Chapel Hill; Parley Avery Salmon, Raleigh, all of N.C.

[73] Assignee: International Business Machines Corporation, Armonk, N.Y.

[21] Appl. No.: 08/947,952

[22] Filed: Oct. 9, 1997

[51] Int. Cl.[7] .................................................. G06F 13/00
[52] U.S. Cl. ........................ 713/202; 709/226; 709/218
[58] Field of Search ........................... 713/202; 709/219, 709/218, 217, 227, 226, 225; 380/3, 4, 23, 25

[56] References Cited

U.S. PATENT DOCUMENTS

| | | | |
|---|---|---|---|
| 5,261,002 | 11/1993 | Perlman et al. | 380/30 |
| 5,455,407 | 10/1995 | Rosen | 235/380 |
| 5,491,815 | 2/1996 | Basso et al. | 395/550 |
| 5,659,616 | 8/1997 | Sudia | 380/23 |
| 5,687,235 | 11/1997 | Perlman et al. | 380/25 |
| 5,689,699 | 11/1997 | Howell et al. | 395/609 |
| 5,699,431 | 12/1997 | Van Dorschot et al. | 380/30 |
| 5,793,868 | 8/1998 | Micali | 380/28 |
| 5,903,651 | 5/1999 | Kocher | 380/25 |
| 5,903,882 | 5/1999 | Asay et al. | 705/44 |

*Primary Examiner*—Norman M. Wright
*Attorney, Agent, or Firm*—Myers Bigel Sibley & Sajovec; Gregory M. Doudnikoff

[57] ABSTRACT

Methods, systems and computer program products are provided for selecting from a plurality of items of date limited information an item of date limited information for transmission from a first data processing system having a first time and date to a second data processing system having a second time and date by selecting an item of date limited information if both a beginning and an end of a validity period of the date limited information are sufficiently distant from the first time and date.

36 Claims, 2 Drawing Sheets

SYSTEMS, METHODS AND COMPUTER PROGRAM PRODUCTS FOR SELECTION OF DATE LIMITED INFORMATION

FIELD OF THE INVENTION

The present invention relates generally to client-server communications, and more particularly to client-server communications utilizing date limited information such as certificates.

BACKGROUND OF THE INVENTION

In client-server communications, a client communicates with a server via a public communications network, such as the Internet, or a private communications network, such as an Intranet. With respect to the Internet, a web browser communicates with a web server using the Transmission Control Protocol/Internet Protocol (TCP/IP). For the majority of Internet communications, a web browser communicates with a web server using the generic Hyper-Text Transfer Protocol (HTTP) which is transmitted between the web browser and the web server over the TCP/IP link between the web browser and the web server. Most web browsers also enable clients to access other server resources and services including File Transfer Protocol (FTP), Telnet, Wide-Area Information Servers (WAIS), and the like.

Two important security issues related to client-server communications are privacy and authentication. Privacy involves keeping anyone except the intended recipient from being able to read a communication between a client and a server. Privacy is typically accomplished using cryptography wherein communications are encrypted prior to transmission and decrypted upon receipt. Authentication involves verifying that the entity with whom a client or server is communicating is, in fact, who the client or server thinks the entity is.

One authentication method utilizes digital certificates (referred to hereinafter as "certificates") to authenticate a message. A certificate is a set of data that identifies an entity, and verifies that the specific public encryption and signature keys included within the certificate belong to that entity. A certificate is issued by a Certification Authority (CA) only after the CA has verified that the specified public encryption key belongs to the specified entity. Furthermore, a certificate may be issued for a limited duration. Thus a certificate may have a "not before" and a "not after" time associated with the certificate which define the duration of validity of the certificate.

When a client sends a request to access certain resources via a server, the server may request that the client transmit a certificate to the server for authentication purposes. The server may check to see if the certificate is valid by comparing the server's system time (based on the server's system clock) to the validity duration of the certificate. If the current time at the server does not fall within the validity duration of the certificate, then the certificate is rejected as invalid.

In a distributed processing environment, there exists the possibility of clock discrepancies between any two processors. For example, the current time value on Processor-A is 02:00:00 GMT while on Processor-B it is 02:00:15 GMT. Such discrepancies can cause processing errors when a processor's current time is compared with date/time values within input data such as a certificate. As described above, the fundamental purpose of a certificate is to bind a subject entity with the public-key of a public/private key pair. However, the certificate may also contain two date/time values, a "not before" time and a "not after" time, to denote the period for which the subject entity is authorized to use the key pair. These two date/time values together are known as the "public-key validity period".

In a typical scenario, the certificate owner uses the private key to digitally sign some binary data. The binary data, the digital signature, and the certificate are combined to create a message that any recipient can validate both the contents and source. However, if the recipient's clock does not exactly agree with the issuer's clock the recipient may reject the message due to a certificate as either not yet valid ("now" prior to not before) or expired ("now" after not after).

As an example, assume that the signer signs something at 02:00:01 using the private key whose corresponding public key is certified for use not before 02:00:00. If the recipient's clock is a few minutes slow and it only takes a second to get the signed message, then the recipient will deem the signed message invalid. It is not uncommon for certificates to be issued in a non-overlapping fashion where a certificate is valid until midnight of the last day of the month and its successor valid the first second of the following month. In environments where clocks cannot be centrally synchronized or where availability is important, it is, therefore, prudent to have overlapping certificate validities. However, overlap itself does not guarantee availability. Using the newer certificate as soon as it is valid or using the older certificate until just before it expires can cause certificate validation failures at the destination.

One particular problem with false certificate invalidity may arise in the area of Secure Electronic Transactions (SETs). An example of a SET may be a credit card purchase over the Internet. In almost all such transactions, the cardholder's computer system clock is likely to be off by minutes from the merchant's computer system clock. As a result, a merchant or payment gateway who utilized their signing or encryption certificates up to the very last second of validity would cause many of their customer's transactions to fail. Likewise, if a merchant or payment gateway uses a brand new certificate as soon as it is valid, the same problem may arise.

Thus, a need exists for improvements in the selection of date limited information to overcome the limitations of unsynchronized clocks at different processing systems.

SUMMARY OF THE INVENTION

In view of the above discussion, it is an object of the present invention to provide for selection of date limited information to increase the likelihood that the date limited information will be valid when received at a remote processor.

It is another object of the present invention to decrease the impact of unsynchronized system clocks at differing computer systems may have on time sensitive data transmissions.

It is another object of the present invention to automatically select certificates used to authenticate client-server requests from a plurality of certificates without the need for user intervention.

These and other objects of the present invention are provided by methods, systems and computer program products for selecting from a plurality of items of date limited information an item of date limited information for transmission from a first data processing system having a first time and date to a second data processing system having a second time and date by selecting an item of date limited information if both a beginning and an end of a validity period of the date limited information are sufficiently distant from the first time and date.

By selecting an item of date limited information based upon the distance from the time and date of the first processing system, the present invention allows for an increased likelihood of validity of date limited information at the second computer. This selection may be accomplished by determining if the times between the first computer date and time and the beginning and end of the validity period of the date limited information are greater than a predefined threshold. Furthermore, this threshold may be defined based upon the type of date limited information, the nature of the communication between the first computer and the second computer or other criteria for establishing an appropriate threshold value. Thus, rather than simply selecting the first valid item of date limited information, the present invention selects an item of date limited information which is likely to be valid when the validity period of the date limited information is evaluated utilizing the second computer's time and date.

In one embodiment of the present invention, the date limited information comprise certificates. The present invention may also include transmitting the selected certificate to the second data processing system.

In particular embodiments of the present invention the items of date limited information are certificates which have a not before time and a not after time associated with the certificate. In such a case, the certificate for transmission may be selected by determining if the difference between the date and time of the first processing system and the not before time and the not after time of a certificate of the plurality of certificates is greater than a predefined threshold value. A certificate may then be selected for transmission if said determining step determines that the difference between the not before time and the not after time of a certificate of the plurality of certificates is greater than a predefined threshold value and the selected certificate may be transmitted to the second data processing system.

In a further embodiment of the present invention, the difference between the date and time of the first processing system and the not after time for a certificate of the plurality of certificates is determined if the difference between the date and time of the first processing system and the not before time and the not after time of the certificate of the plurality of certificates is less than the predefined threshold value. Each of the plurality of certificates are then scored based upon the determined difference between the not before time and the not after time and the first date and time if the difference between the not before time and the not after time of each of the certificates of the plurality of certificates is less than the predefined threshold value. A certificate is then selected from the plurality of certificates for transmission to the second data processing system based upon the scores of each of the plurality of certificates if the difference between the not before time and the not after time of each of the certificates of the plurality of certificates is less than the predefined threshold value.

In an alternative embodiment of the present invention, the difference between the date and time of the first processing system and the not before time is determined for each of the plurality of certificates. Each of the plurality of certificates are then scored based upon the determined difference between the not before time and the not after time and the first date and time and a certificate selected from the plurality of certificates for transmission to the second data processing system based upon the scores of each of the plurality of certificates. Preferably, the certificate with the highest probability of validity based upon the score of the certificate is selected.

In a still further embodiment of the present invention it is determined whether the difference between the not before time and the not after time of a certificate of the plurality of certificates is greater than a predefined threshold value and that certificate is selected if the difference between the not before time and the not after time of a certificate of the plurality of certificates is greater than a predefined threshold value. In such a case, the determination of the difference between the date and time of the first processing system and the not before time for each of the plurality of certificates, the determination of the difference between the date and time of the first processing system and the not after time for each of the plurality of certificates, the scoring each of the plurality of certificates based upon the determined difference between the not before time and the not after time and the first date and time and the selection of a certificate from the plurality of certificates for transmission to the second data processing system based upon the scores of each of the plurality of certificates are not carried out if the difference between the not before time and the not after time of a certificate of the plurality of certificates is greater than a predefined threshold value.

In determining the score of a certificate, the score of a certificate may be assigned the lesser of the difference between the not before time and the first time and date and the difference between the not after time and the first time and date. The selection may then be the selection of the certificate with the highest score.

By determining if a certificate's validity period is both older than and good for at least a predetermined threshold, then discrepancies of less than that threshold between two data processing systems system clocks will not result in the certificate being found invalid. Furthermore, if the threshold value is not met by any of the certificates or if such a determination is not desired, then the certificate with the highest likelihood of being valid (i.e. the highest score) is selected. Accordingly, the present invention provides for increasing the likelihood that date limited information will be found valid despite unsynchronized system clocks by selecting an item of date limited information based on the amount of safety margin in the validity period of the item.

As will be appreciated by those of skill in the art, the present invention may be embodied as methods, apparatus or computer program products.

DETAILED DESCRIPTION OF THE INVENTION

Figure 1:
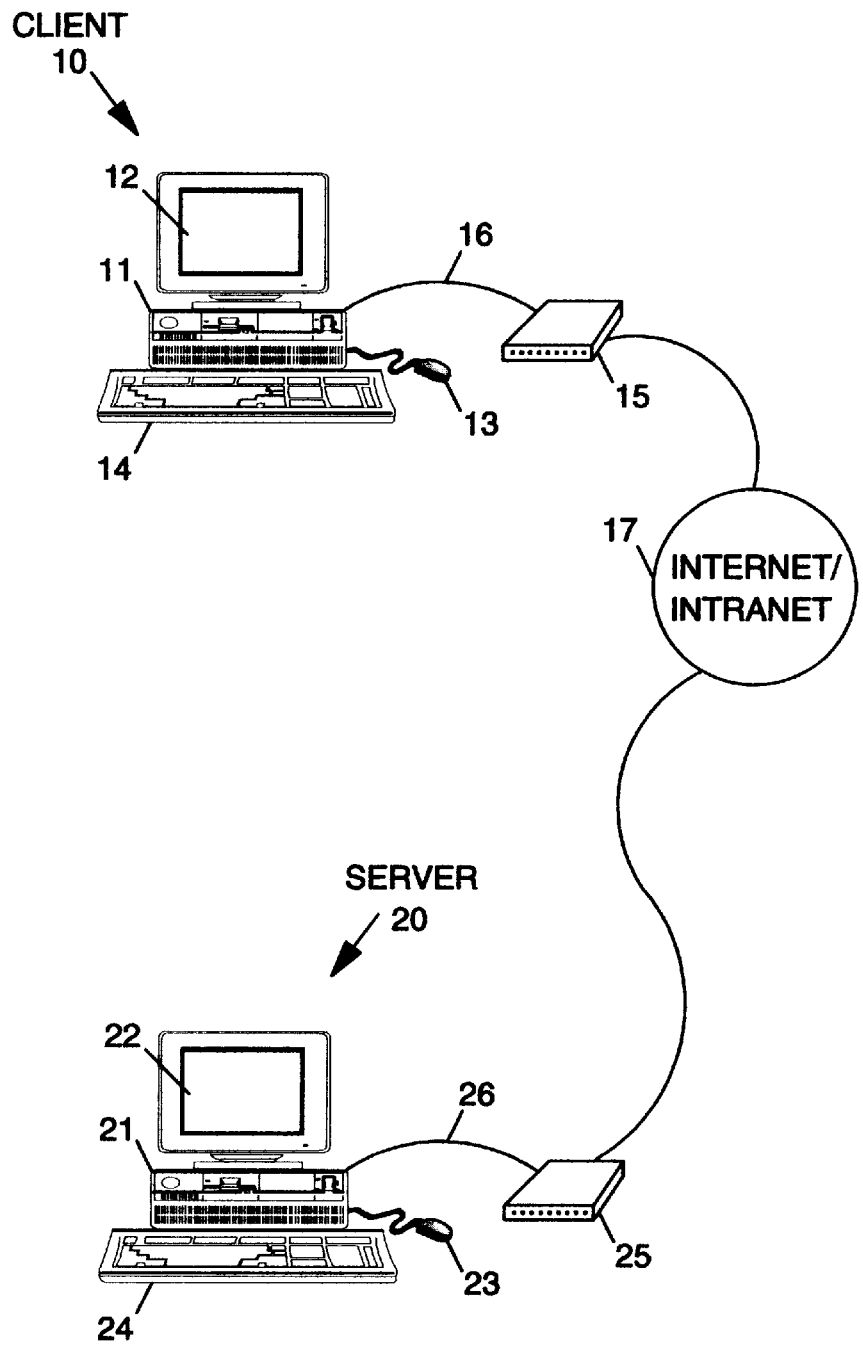
FIG. 1 schematically illustrates a client and server in communication via a computer network.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described herein with reference to "certificates." However, as will be appreciated by those of skill in the art, the present invention may be utilized with any date limited information. Date limited information where the validity of the information is, at least in part, determined by a date and/or time when the information is valid. Thus, date limited information typically has a start date and an end date which define a "validity period" for the date limited information. Thus, the problem of unsynchronized system clocks on two different computers may result with the use of date limited information. The present invention has also been described with respect to X.509 certificates. However, the present invention may be equally applicable to HTTPS, PKCS7, SSL or other secure transaction systems. Accordingly, the present invention should not be construed as limited to certificates.

Furthermore, the term "time" as used herein refers to a date and/or time of day as appropriate. The term "date" used herein refers to a date with an implied time of day or an explicit time of day. Thus, for example, an item of information with an expiration time of Jun. 1, 1997 may include an explicit expiration time of day such as 15:00:00 or an implied time of day of 23:59:59.

Client-Server Communications

As is known to those with skill in the art, client-server environments may include public networks, such as the Internet, and private networks often referred to as "Intranets." Hereinafter, all references to server resources shall include resources accessible via any communications network, including, but not limited to web servers. Hereinafter, the term "Internet" shall incorporate the term "Intranet" and any references to accessing the Internet shall be understood to mean accessing an Intranet as well. Hereinafter, the term "computer network" shall incorporate publicly accessible computer networks and private computer networks.

As illustrated in FIG. 1, users may access the Internet via a computer or terminal referred to as a client 10. Exemplary clients 10 may include, but are not limited to, an Apple®, Sun Microsystems®, IBM®, or IBM-compatible personal computer. A client 10 preferably includes a central processing unit 11, a display 12, a pointing device 13, a keyboard 14, access to persistent data storage, and an Internet connection 16 for connecting to the Internet 17. The keyboard 14, having a plurality of keys thereon, is in communication with the central processing unit 11. A pointing device 13, such as a mouse, is also connected to the central processing unit 11. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP"). The Internet connection 16 may be made either by a direct connection of the client 10 to the Internet or indirectly via another device connected to the Internet. In the latter case, the client 10 is typically connected to this device via a local or wide area network (LAN or WAN). Preferably, data transfer rates between a client 10 and a server are equal to, or greater than, fourteen thousand four hundred baud (14,400 baud). However, lower data transfer rates are sometimes encountered.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client 10 and a server (described in detail below) to store various data transferred from the server.

Preferably, a client 10 has an Intel® 80386 processor (or equivalent) with at least eight megabytes (8 MB) of RAM, and at least five megabytes (5 MB) of persistent computer storage 15 for caching. Even more preferable is an Intel® 80486 or Pentium® processor (or equivalent). However, it is to be understood that various processors may be utilized to carry out the present invention without being limited to those enumerated herein. Although a color display is preferable, a black and white display or standard broadcast or cable television monitor may be used. A client 10, if an IBM®, or IBM-compatible personal computer, preferably utilizes either a Windows®3.1, Windows 95®, Windows NT®, Unix®, or OS/2® operating system. However, it is to be understood that a terminal not having computational capability, such as an IBM® 3270 terminal or a network computer (NC), or having limited computational capability, such as a network personal computer, may be utilized in accordance with an embodiment of the present invention for accessing the Internet in a client capacity.

A user accesses web server resources by establishing a TCP connection between the client 10 and a server 20 (referred to hereinafter as a web server) hosting the resources. For the majority of Internet communications, a client communicates with a web server using HTTP protocol over the TCP connection between the client and web server. The data transferred between the client and the web server are HTTP data objects (e.g. HTML data). A web server may be a proxy that receives requests from a number of clients and routes the requests to the appropriate web server. A web server may also be referred to as an HTTP server.

A web server 20 may have a configuration similar to that of a client 10 and may include a central processing unit 21, a display 22, a pointing device 23, a keyboard 24, access to persistent data storage 25, and an Internet connection 26 for connecting to the Internet 17 via a modem 25, or otherwise. It is preferable that a web server have an Intel® Pentium® processor or equivalent, at least sixteen megabytes (16 MB) of RAM, and at least eight hundred megabytes (800 MB) of data storage. However, a web server 20 may be implemented using other processors and via other computing devices, including, but not limited to, mainframe computing systems and mini-computers. Web server software handles requests from clients for documents, whether they are text, graphic, multimedia, or virtual. The web server software may run under the operating system of the web server.

It is understood that a client or web server or other apparatus configured to execute program code embodied within computer usable media, operates as means for performing the various functions and carries out the methods of the various operations of the present invention.

One example of a security protocol utilizing date limited information is the Secure Socket Layer (SSL) protocol developed by Netscape Communications Corporation, Mountain View, Calif., to allow secure transactions over the Internet. The SSL protocol is application independent and allows other protocols, such as HTTP, File Transfer Protocol (FTP) and Telnet to be layered on top transparently. The SSL protocol can negotiate encryption keys and can authenticate requests before data is exchanged between a client and server via higher-level applications.

The SSL protocol includes both server authentication and client authentication. With respect to server authentication, a server, in response to a client's request, sends its certificate and encryption preferences to the client. The client generates a master key, which it encrypts with the server's public key, and transmits the encrypted master key to the server. The server receives the encrypted master key and authenticates itself to the client by returning a message encrypted with the master key. The server then sends a request to the client to authenticate itself. The client authenticates itself to the server by returning its public key within a certificate. As is known to those skilled in the art, various cryptographic algorithms are supported by the SSL protocol.

Cryptography often involves the use of a pair of "keys" to encrypt and decrypt data. Related by a mathematical algorithm, the keys in the pair are often referred to as a "public" and a "private" key. As is known to those skilled in the art, the key used to encrypt data is often different than the key used to decrypt the same data. Typically, a private key is kept secret and its corresponding mate, the public key, is distributed to others. Typically, any public key can encrypt messages, but only the holder of the private key can decrypt and read them. A public key can also be used to decrypt messages, but typically only if the messages were encrypted by the private key in the pair.

For example, if a user wants to send a message to a server via a client, the client encrypts the message using the server's public key. The server decrypts the received message using the server's private key. Therefore, encryption may take place without having to share private keys. Clients and servers can send encrypted messages using only public keys, but typically can only decrypt a message if in possession of the correct private key.

Certificates

A certificate is a data file which may include encrypted data and which may include the name and other identifying information about the holder of the certificate. A certificate also includes a public key that is used to verify the digital signature of the holder. The digital signature is made with a related, unique private key. Digital certificates enable clients and servers to reliably identify each other and protect any information that may be exchanged therebetween. The certificate itself is digitally signed by a trusted third party known as a Certificate Authority (CA) to authenticate the certificate holder. Thus, certificates contain identifying information about the certificate holder and the issuing organization that is difficult to forge or alter.

A CA is a trusted entity willing to vouch for the identities of those to whom it issues certificates. Exemplary CAs include: a company that issues certificates to its employees; a professional body that issues certificates to its members; and a country that issues certificates to its citizens. Exemplary commercial CAs include Verisign (http://www.verisign. com) and GTE CyberTrust (http://www.cybertrust.gte. com).

Often there is a hierarchy of CAs in order to maintain a high level of trust in issued certificates. Usually, there is one root CA whom everybody trusts. The root CA may be an organization's headquarters, a professional body or a government agency. The root CA may issue certificates to a number of sub-level CAs that adhere to a set of policies dictated by the root CA. Each sub-level CA may issue certificates to CAs beneath it in the chain or to end users directly. Because of this hierarchy, two users with certificates issued by different CAs in the hierarchy will be able to mutually authenticate each other by verifying the signature of a higher level CA.

When a user sends a request to a server via a client, the user can attach his/her certificate with the request. On receiving the certificate, the server uses the user's certificate to verify that the user's public key is authentic and then uses that public key to verify the request itself. To do this, the server uses the CA's public key to verify the user's identity. If the server does not trust the CA who issued the user's certificate, the server can obtain the CA's certificate and verify it. This process can be repeated up the CA hierarchy as many times as required until the server reaches either a CA it trusts, or the root CA.

A widely accepted international standard for certificates is defined in the ISO authentication framework X.509 (http://www.rsa.com/rsalabs/newfaq/q165.html). This standard requires all certificates to contain a version number, a serial number, an algorithm identifier, the name of the issuer, the validity period, the subject or distinguished name, the subject public key, an issuer unique identifier, a subject unique identifier, an extension field and the CA's signature. X.509 certificates also include a validity duration or validity period which is defined by a "not before" and a "not after" time. The X.509 standard is supported by a number of transaction layer security protocols such as SSL. Thus, the present invention is particularly useful with X.509 certificates.

A user may also acquire multiple certificates. Multiple certificates may, for example, be obtained so that continuous operation may be maintained by providing certificates for subsequent use before expiration of an existing certificate. Furthermore, if overlapping certificates are employed multiple certificates may be provided which are concurrently valid based upon a user's system time. However multiple certificates are obtained by a data processing system, when a message is to be sent with a certificate the data processing system must select the certificate to send. This selection process is carried out utilizing the present invention.

Figure 2:
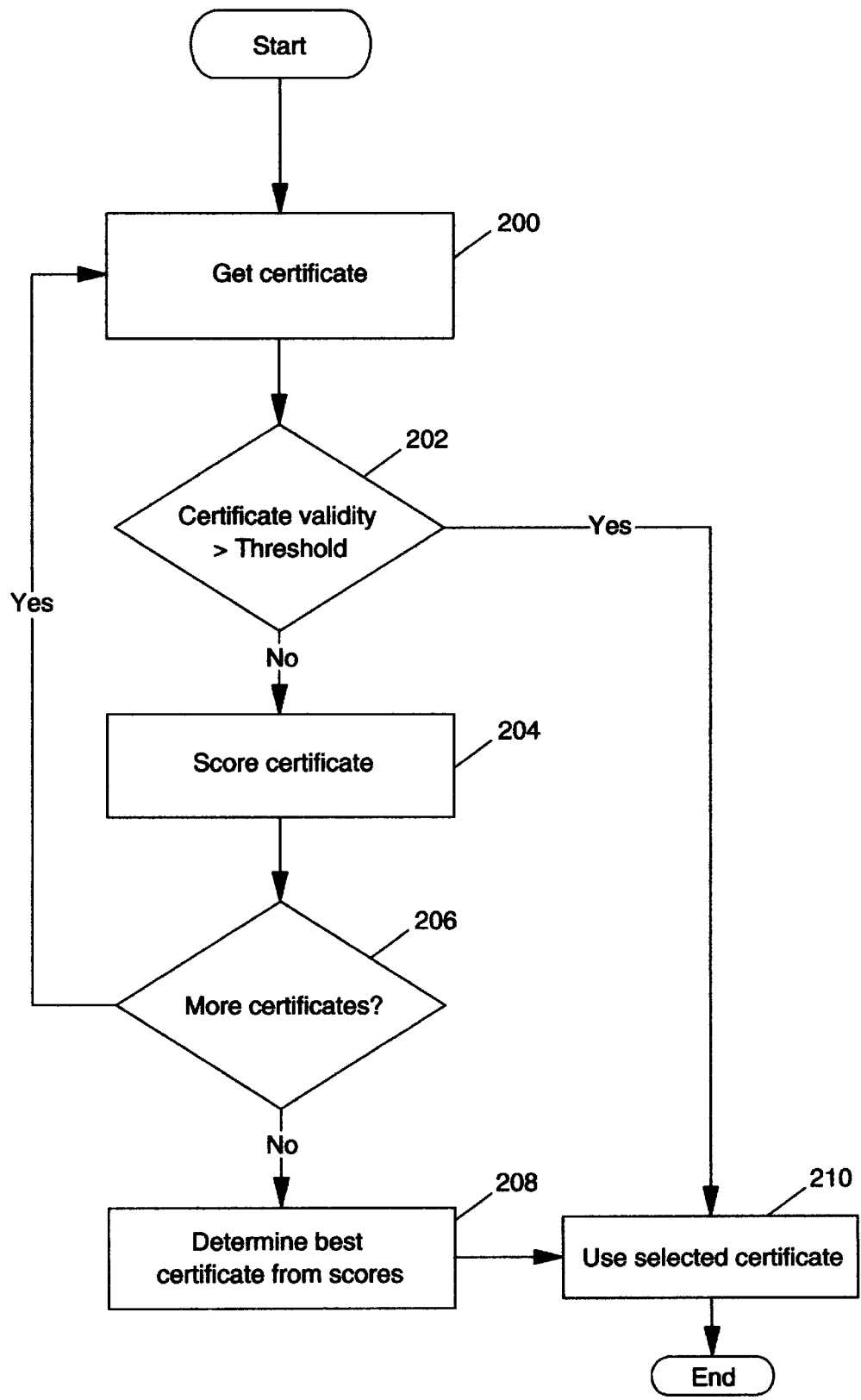
FIG. 2 is a flowchart schematically illustrating operations for various aspects of the present invention.

Operations for various aspects of the present invention are illustrated in FIG. 2. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 2 illustrates one embodiment of the present invention. As is seen in FIG. 2, the first operation of the present invention is to obtain a certificate from a plurality of certificates (block 200) previously obtained by the data processing system. As will be appreciated by those of skill in the art, the data processing system may obtain a plurality of certificates in any number of ways, including pre-fetching certificates in anticipation of an existing certificate expiring.

However the data processing system obtains the plurality of certificates, the data processing system obtains a first certificate from the plurality of certificates for evaluation (block 200). The data processing system then determines if the validity period of the certificates is sufficiently distant from the time of the first computer. To make this determination, the data processing system determines whether the "not before" time of the certificate is more than a predefined threshold from the current date and time of day of the data processing system (block 202). The data processing system also determines whether the "not after" time is also further away from the current date and time of day of the data processing system than the predefined threshold value (block 202).

In selecting a predefined threshold, a number of factors may be considered. These factors include the validity period of the certificates. Thus, for example a threshold of one day would be appropriate for a certificate with a valid duration of one month but may be inappropriate for a certificate with a valid duration of 12 hours. Similarly, a threshold of one hour may be less than desirable for a certificate with a valid duration of one year. The threshold value should also be selected based upon the likely discrepancy between the first data processing system clock and the second data processing system clock. Thus, for example, it is more likely that the system clocks of the two data processing systems would be off by ten seconds then it is that they would be off by ten days. The threshold value may also be selected based on the mechanism of transmission of the certificate. For example, a greater threshold may be selected if the certificate is part of an e-mail message than if the certificate is sent via a direct connection. Thus, the predefined threshold may be dynamically selected based upon characteristics of the certificates, the communications mechanisms or other factors relating to the likelihood that the certificate will be considered valid at the receiving system. However, for many certificates a threshold value of one day may be acceptable.

Furthermore, the validity period of the certificate may be differentially evaluated based upon the communication mechanism. Two threshold values may be established, one for the "not before" date and one for the "not after" date. For example, if the certificate is transmitted by e-mail it may increase the likelihood of validity at the recipient if the threshold value associated with the difference between the current date and time of day and the "not after" date is larger than the threshold value associated with the "not before" date. Thus, the threshold values may be adjusted to account for a delay in the communication mechanism.

If both of the "not before" and "not after" conditions are satisfied then there is a high probability of the certificate being valid and the certificate is selected for use by the data processing system. As illustrated in block 210, the selected certificate is then utilized by the data processing system which may include transmission of the certificate to the second data processing system. By selecting a certificate that has a difference between the current time and the validity period of the certificate which is greater than a predefined threshold difference, the present invention selects the certificate if the probability of validity at the second data processing system is above a threshold probability. This threshold probability, however, need not be explicitly calculated as it is incorporated into the selection of the threshold difference value.

If both of these conditions are not satisfied then the likelihood of validity is such that there is a need to examine other certificates. Thus, the current certificate is scored (block 204) as to its probability of validity. The scoring process is accomplished by determining the difference between the current date and time of day of the data processing system and the "not before" and "not after" times of the certificate. The lower difference value is then used as the score for this certificate (block 204) and the score of the certificate is stored for future evaluation as discussed below. The data processing system then determines if more certificates exist to be evaluated (block 206). If more certificates are available for evaluation then the data processing system returns to block 200 to obtain another certificate.

If a subsequent certificate satisfies the criteria of block 202 then that certificate is selected for utilization. This process of testing and scoring continues until either a certificate passes the test of block 202 or no more certificates are available (see block 206 and blocks 200 through 204).

When no more certificates are available and none of the certificates satisfy the criteria of block 202, then the data processing system determines which certificate had the best score (block 208). The determination of the certificate with the best score may be accomplished by evaluating the stored scores corresponding to the certificates to determine the certificate with the highest score. The certificate with the highest score is the certificate with the greatest minimum difference between the current time and the "not before" and "not after" times of the certificate. The certificate with the highest score will tolerate the highest deviation between the system clock of the first data processing system and the system clock of the second data processing system which still being considered valid. Thus, by selecting the certificate with the highest score, the certificate with the highest probability of validity at the second data processing system may be utilized by the first data processing system. Accordingly, at block 210 the selected certificate is utilized by the first data processing system which may include transmission to the second data processing system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of selecting from a plurality of items of date limited information an item of date limited information for transmission from a first data processing system having a first time and date to a second data processing system having a second time and date, the method comprising the steps of:
   determining if both a beginning and an end of a validity period of an item of date limited information are farther from the first time and date than a predefined threshold; and
   selecting the item of date limited information if the beginning and end of the validity period of the item of date limited information is farther from the first time and date than the predefined threshold value.

2. A method according to claim 1, further comprising the step of:
   dynamically selecting the predefined threshold value for communication.

3. A method according to claim 1, wherein said step of selecting the item of date limited information if the beginning and end of the validity period of the item of date limited information is farther from the first time and date than the predefined threshold value, comprises the step of selecting the item of date limited information if the beginning of the validity period of the item of date limited information is farther from the first time and date than a first predefined threshold value and if the end of the validity period of the item of date limited information is farther from the first time and date than a second predefined threshold value.

4. A method according to claim 1, wherein the plurality of items of date limited information comprise a plurality of certificates and wherein said selecting step selects a certificate.

5. A method according to claim 4, further comprising the step of transmitting the selected certificate to the second data processing system.

6. A method according to claim 4, wherein each of the plurality of certificates has a not before time and a not after time associated with the certificate and wherein said step of selecting comprises the steps of:
   determining if the difference between the not before time and the not after time of a certificate of the plurality of certificates is greater than a predefined threshold value;
   selecting a certificate for transmission if said determining step determines that the difference between the not before time and the not after time of a certificate of the plurality of certificates is greater than a predefined threshold value; and
   transmitting the selected certificate to the second data processing system.

7. A method of selecting from a plurality of items of date limited information an item of date limited information for transmission from a first data processing system having a first time and date to a second data processing system having a second time and date, the method comprising the step of:
   selecting an item of date limited information if both the beginning and an end of a validity period of the date limited information are sufficiently distant from the first time and date;
   wherein the plurality of items of date limited information comprise a plurality of certificates, wherein each of the plurality of certificates has a not before time and a not after time associated with the certificate and wherein said step of selecting comprises the steps of:
   determining if the difference between the not before time and the not after time of a certificate of the plurality of certificates is greater than a predefined threshold value;
   selecting a certificate for transmission if said determining step determines that the difference between the not before time and the not after time of a certificate of the plurality of certificates is greater than a predefined threshold value;
   determining the difference between the date and time of the first processing system and the not before time for the certificate if the difference between the not before time and the not after time of a certificate of the plurality of certificates is less than the predefined threshold value;
   scoring each of the plurality of certificates based upon the determined difference between the not before time and the not after time and the first date and time if the difference between the not before time and the not after time of each of the certificates of the plurality of certificates is less than the predefined threshold value;
   selecting a certificate from the plurality of certificates for transmission to the second data processing system based upon the scores of each of the plurality of certificates if the difference between the not before time and the not after time of each of the certificates of the plurality of certificates is less than the predefined threshold value; and
   transmitting the selected certificate to the second data processing system.

8. A method of selecting from a plurality of items of date limited information an item of date limited information for transmission from a first data processing system having a first time and date to a second data processing system having a second time and date, the method comprising the step of:
   selecting an item of date limited information if both the beginning and an end of a validity period of the date limited information are sufficiently distant from the first time and date;
   wherein the plurality of items of date limited information comprise a plurality of certificates, wherein each of the plurality of certificates has a not before time and a not after time associated with the certificate and wherein said step of selecting comprises the steps of:
   determining the difference between the date and time of the first processing system and the not before time for each of the plurality of certificates;

determining the difference between the date and time of the first processing system and the not after time for each of the plurality of certificates;

scoring each of the plurality of certificates based upon the determined difference between the not before time and the not after time and the first date and time; and selecting a certificate from the plurality of certificates for transmission to the second data processing system based upon the scores of each of the plurality of certificates.

9. A method according to claim 8, wherein said step of selecting a certificate comprises the step of selecting a certificate with the highest probability of validity based upon the score of the certificate.

10. A method according to claim 8, further comprising the steps of:

determining if the difference between the not before time and the not after time of a certificate of the plurality of certificates is greater than a predefined threshold value;

selecting a certificate for transmission if said determining step determines that the difference between the not before time and the not after time of a certificate of the plurality of certificates is greater than a predefined threshold value; and wherein said step of determining the difference between the date and time of the first processing system and the not before time for each of the plurality of certificates, said step of determining the difference between the date and time of the first processing system and the not after time for each of the plurality of certificates, said step of scoring each of the plurality of certificates based upon the determined difference between the not before time and the not after time and the first date and time and said step of selecting a certificate from the plurality of certificates for transmission to the second data processing system based upon the scores of each of the plurality of certificates are carried out if said step of determining if the difference between the not before time and the not after time of a certificate of the plurality of certificates is greater than a predefined threshold value determines that none of the certificates of the plurality of certificates are greater than the predefined threshold.

11. A method according to claim 8, wherein said step of scoring comprises the step of assigning as the score of a certificate the lesser of the determined difference between the not before time and the first time and date and the difference between the not after time and the first time and date.

12. A method according to claim 11, wherein said step of selecting a certificate comprises the step of selecting the certificate with the highest score.

13. A system for selecting from a plurality of items of date limited information an item of date limited information for transmission from a first data processing system having a first time and date to a second data processing system having a second time and date, comprising:

means for determining the distance between a beginning and an end of a validity period of an item of date limited information and the first time and date; and means for selecting the item of date limited information if the beginning and end of the validity period of the item of date limited information are farther from the first time and date than a predefined threshold value.

14. A system according to claim 13, further comprising:

means for dynamically selecting the predefined threshold value for a communication.

15. A system according to claim 13, wherein said means for selecting an item of date limited information if the beginning and end of the validity period of the item of date limited information is farther from the first time and date than a predefined threshold value, comprise means for selecting an item of date limited information if the beginning of the validity period of the item of date limited information is farther from the first time and date than a first predefined threshold value and if the end of the validity period of the item of date limited information is farther from the first time and date than a second predefined threshold value.

16. A system according to claim 13, wherein the plurality of items of date limited information comprise a plurality of certificates and wherein said means for selecting selects a certificate.

17. A system according to claim 16, further comprising means for transmitting the selected certificate to the second data processing system.

18. A system according to claim 17, wherein each of the plurality of certificates has a not before time and a not after time associated with the certificate and wherein said means for determining, said means for selecting and said means for transmitting include:

means for determining if the difference between the not before time and the not after time of a certificate of the plurality of certificates is greater than a predefined threshold value;

means for selecting a certificate for transmission if said means for determining determines that the difference between the not before time and the not after time of a certificate of the plurality of certificates is greater than a predefined threshold value; and means for transmitting the selected certificate to the second data processing system.

19. A system for selecting from a plurality of items of date limited information an item of date limited information for transmission from a first data processing system having a first time and date to a second data processing system having a second time and date, comprising:

means for determining the distance between a beginning and an end of a validity period of an item of date limited information and the first time and date;

means for selecting the item of date limited information if both the beginning and the end of the validity period of the date limited information are sufficiently distant from the first time and date;

wherein the plurality of items of date limited information comprise a plurality of certificates, wherein each of the plurality of certificates has a not before time and a not after time associated with the certificate and wherein said means for determining, said means for selecting and said means for transmitting include:

means for determining if the difference between the not before time and the not after time of a certificate of the plurality of certificates is greater than a predefined threshold value;

means for selecting a certificate for transmission if said means for determining determines that the difference between the not before time and the not after time of a certificate of the plurality of certificates is greater than a predefined threshold value;

means for determining the difference between the date and time of the first processing system and the not before time for the certificate if the difference between the not before time and the not after time of a certificate of the plurality of certificates is less than the predefined threshold value;

means for scoring each of the plurality of certificates based upon the determined difference between the not before time and the not after time and the first date and time if the difference between the not before time and the not after time of each of the certificates of the plurality of certificates is less than the predefined threshold value;

means for selecting a certificate from the plurality of certificates for transmission to the second data processing system based upon the scores of each of the plurality of certificates if the difference between the not before time and the not after time of each of the certificates of the plurality of certificates is less than the predefined threshold value; and means for transmitting the selected certificate to the second data processing system.

20. A system for selecting from a plurality of items of date limited information an item of date limited information for transmission from a first data processing system having a first time and date to a second data processing system having a second time and date, comprising:

means for determining the distance between a beginning and an end of a validity period of an item of date limited information and the first time and date;

means for selecting the item of date limited information if both the beginning and the end of the validity period of the date limited information are sufficiently distant from the first time and date;

wherein the plurality of items of date limited information comprise a plurality of certificates, wherein said means for selecting selects a certificate, wherein each of the plurality of certificates has a not before time and a not after time associated with the certificate and wherein said means for determining and said means for selecting include:

means for determining the difference between the date and time of the first processing system and the not before time for each of the plurality of certificates;

means for determining the difference between the date and time of the first processing system and the not after time for each of the plurality of certificates;

means for scoring each of the plurality of certificates based upon the determined difference between the not before time and the not after time and the first date and time; and means for selecting a certificate from the plurality of certificates for transmission to the second data processing system based upon the scores of each of the plurality of certificates.

21. A system according to claim 20, wherein said means for selecting comprises means for selecting a certificate with the highest probability of validity based upon the score of the certificate.

22. A system according to claim 20, further comprising:

means for determining if the difference between the not before time and the not after time of a certificate of the plurality of certificates is greater than a predefined threshold value;

means for selecting a certificate for transmission if said determining step determines that the difference between the not before time and the not after time of a certificate of the plurality of certificates is greater than a predefined threshold value; and control means for controlling said means for determining the difference between the date and time of the first processing system and the not before time for each of the plurality of certificates, said means for determining the difference between the date and time of the first processing system and the not after time for each of the plurality of certificates, said means for scoring each of the plurality of certificates based upon the determined difference between the not before time and the not after time and the first date and time and said means for selecting a certificate from the plurality of certificates for transmission to the second data processing system based upon the scores of each of the plurality of certificates based upon the difference between the not before time and the not after time of each of the certificates of the plurality of certificates.

23. A system according to claim 20, wherein said means for scoring comprises means for assigning as the score of a certificate the lesser of the determined difference between the not before time and the first time and date and the difference between the not after time and the first time and date.

24. A system according to claim 23, wherein said means for selecting comprises means for selecting the certificate with the highest score.

25. A computer program product for selecting from a plurality of date limited information an item of date limited information for transmission from a first data processing system having a first time and date to a second data processing system having a second time and date, the computer program product comprising:

a computer-readable storage medium having computer-readable program code means embodied in said medium, said computer-readable program code means comprising:

computer-readable program code means for determining the distance between a beginning and an end of a validity period of an item of date limited information and the first time and date; and computer-readable program code means for selecting the item of date limited information if the beginning and end of the validity period of the item of date limited information are farther from the first time and date than a predefined threshold value.

26. A computer program product according to claim 25, further comprising:

computer-readable program code means for dynamically selecting the predefined threshold value for a communication.

27. A computer program product according to claim 25, wherein said computer-readable program code means for selecting an item of date limited information if the beginning and end of the validity period of the item of date limited information is farther from the first time and date than a predefined threshold value, comprise computer-readable program code means for selecting an item of date limited information if the beginning of the validity period of the item of date limited information is farther from the first time and date than a first predefined threshold value and if the end of the validity period of the item of date limited information is farther from the first time and date than a second predefined threshold value.

28. A computer program product according to claim 25, wherein the date limited information comprise certificates.

29. A computer program product according to claim 28, further comprising computer-readable program code means for transmitting the selected certificate to the second data processing system.

30. A computer program product according to claim 28, wherein each of the plurality of certificates has a not before time and a not after time associated with the certificate and wherein said computer-readable program code means for determining, said computer-readable program code means for selecting and said computer-readable program code means for transmitting include:

computer-readable program code means for determining if the difference between the not before time and the not after time of a certificate of the plurality of certificates is greater than a predefined threshold value;

computer-readable program code means for selecting a certificate for transmission if said computer-readable program code means for determining determines that the difference between the not before time and the not after time of a certificate of the plurality of certificates is greater than a predefined threshold value; and computer-readable program code means for transmitting the selected certificate to the second data processing system.

31. A computer program product for selecting from a plurality of date limited information an item of date limited information for transmission from a first data processing system having a first time and date to a second data processing system having a second time and date, the computer program product comprising:

a computer-readable storage medium having computer-readable program code means embodied in said medium, said computer-readable program code means comprising:

computer-readable program code means for determining the distance between a beginning and an end of a validity period of an item of date limited information and the first time and date;

computer-readable program code means for selecting the item of date limited information if both the beginning and the end of the validity period of the date limited information are sufficiently distant from the first time and date;

wherein the date limited information comprise certificates, wherein each of the plurality of certificates has a not before time and a not after time associated with the certificate and wherein said computer-readable program code means for determining, said computer-readable program code means for selecting and said computer-readable program code means for transmitting include:

computer-readable program code means for determining if the difference between the not before time and the not after time of a certificate of the plurality of certificates is greater than a predefined threshold value;

computer-readable program code means for selecting a certificate for transmission if said computer-readable program code means for determining determines that the difference between the not before time and the not after time of a certificate of the plurality of certificates is greater than a predefined threshold value;

computer-readable program code means for determining the difference between the date and time of the first processing system and the not before time for the certificate if the difference between the not before time and the not after time of a certificate of the plurality of certificates is less than the predefined threshold value;

computer-readable program code means for scoring each of the plurality of certificates based upon the determined difference between the not before time and the not after time and the first date and time if the difference between the not before time and the not after time of each of the certificates of the plurality of certificates is less than the predefined threshold value;

computer-readable program code means for selecting a certificate from the plurality of certificates for transmission to the second data processing system based upon the scores of each of the plurality of certificates if the difference between the not before time and the not after time of each of the certificates of the plurality of certificates is less than the predefined threshold value; and computer-readable program code means for transmitting the selected certificate to the second data processing system.

32. A computer program product for selecting from a plurality of date limited information an item of date limited information for transmission from a first data processing system having a first time and date to a second data processing system having a second time and date, the computer program product comprising:

a computer-readable storage medium having computer-readable program code means embodied in said medium, said computer-readable program code means comprising:

computer-readable program code means for determining the distance between a beginning and an end of a validity period of an item of date limited information and the first time and date;

computer-readable program code means for selecting the item of date limited information if both the beginning and the end of the validity period of the date limited information are sufficiently distant from the first time and date;

wherein the date limited information comprise certificates, wherein each of the plurality of certificates has a not before time and a not after time associated with the certificate and wherein said computer-readable program code means for determining and said computer-readable program code means for selecting include:

computer-readable program code means for determining the difference between the date and time of the first processing system and the not before time for each of the plurality of certificates;

computer-readable program code means for determining the difference between the date and time of the first processing system and the not after time for each of the plurality of certificates;

computer-readable program code means for scoring each of the plurality of certificates based upon the determined difference between the not before time and the not after time and the first date and time; and computer-readable program code means for selecting a certificate from the plurality of certificates for transmission to the second data processing system based upon the scores of each of the plurality of certificates.

33. A computer program product according to claim 32, wherein said computer-readable program code means for selecting a certificate comprises computer-readable program code means for selecting a certificate with the highest probability of validity based upon the score of the certificate.

34. A computer program product according to claim 32, further comprising:

computer-readable program code means for determining if the difference between the not before time and the not after time of a certificate of the plurality of certificates is greater than a predefined threshold value;

computer-readable program code means for selecting a certificate for transmission if said determining step determines that the difference between the not before time and the not after time of a certificate of the plurality of certificates is greater than a predefined threshold value; and control computer-readable program code means for controlling said computer-readable program code means for determining the difference between the date and time of the first processing system and the not before time for each of the plurality of certificates, said computer-readable program code means for determining the difference between the date and time of the first processing system and the not after time for each of the plurality of certificates, said computer-readable program code means for scoring each of the plurality of certificates based upon the determined difference between the not before time and the not after time and the first date and time and said computer-readable program code means for selecting a certificate from the plurality of certificates for transmission to the second data processing system based upon the scores of each of the plurality of certificates based upon the difference between the not before time and the not after time of each of the certificates of the plurality of certificates.

35. A computer program product according to claim 32, wherein said computer-readable program code means for scoring comprises computer-readable program code means for assigning as the score of a certificate the lesser of the determined difference between the not before time and the first time and date and the difference between the not after time and the first time and date.

36. A computer program product according to claim 35, wherein said computer-readable program code means for selecting comprises computer-readable program code means for selecting the certificate with the highest score.

* * * * *